Figure 14:
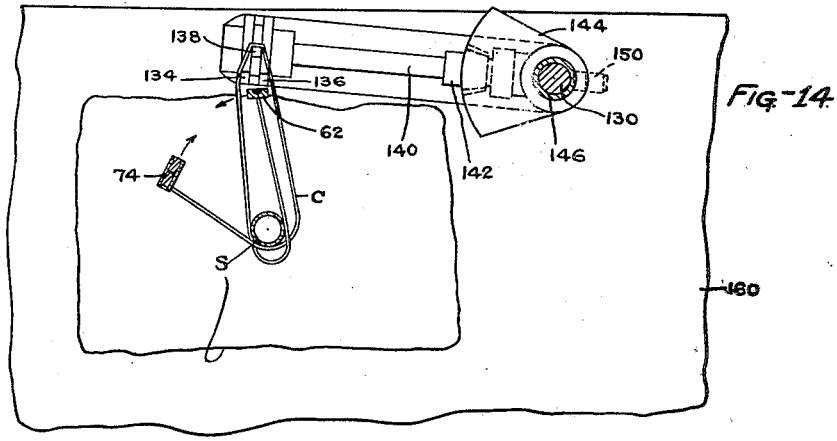
Figure 15:
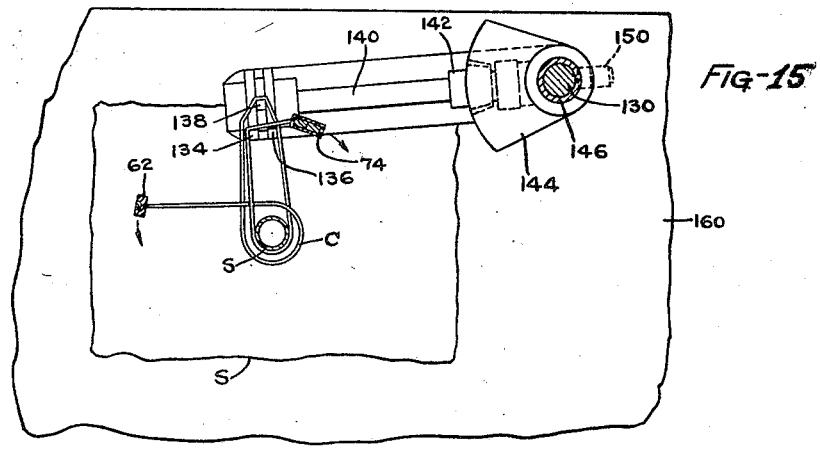

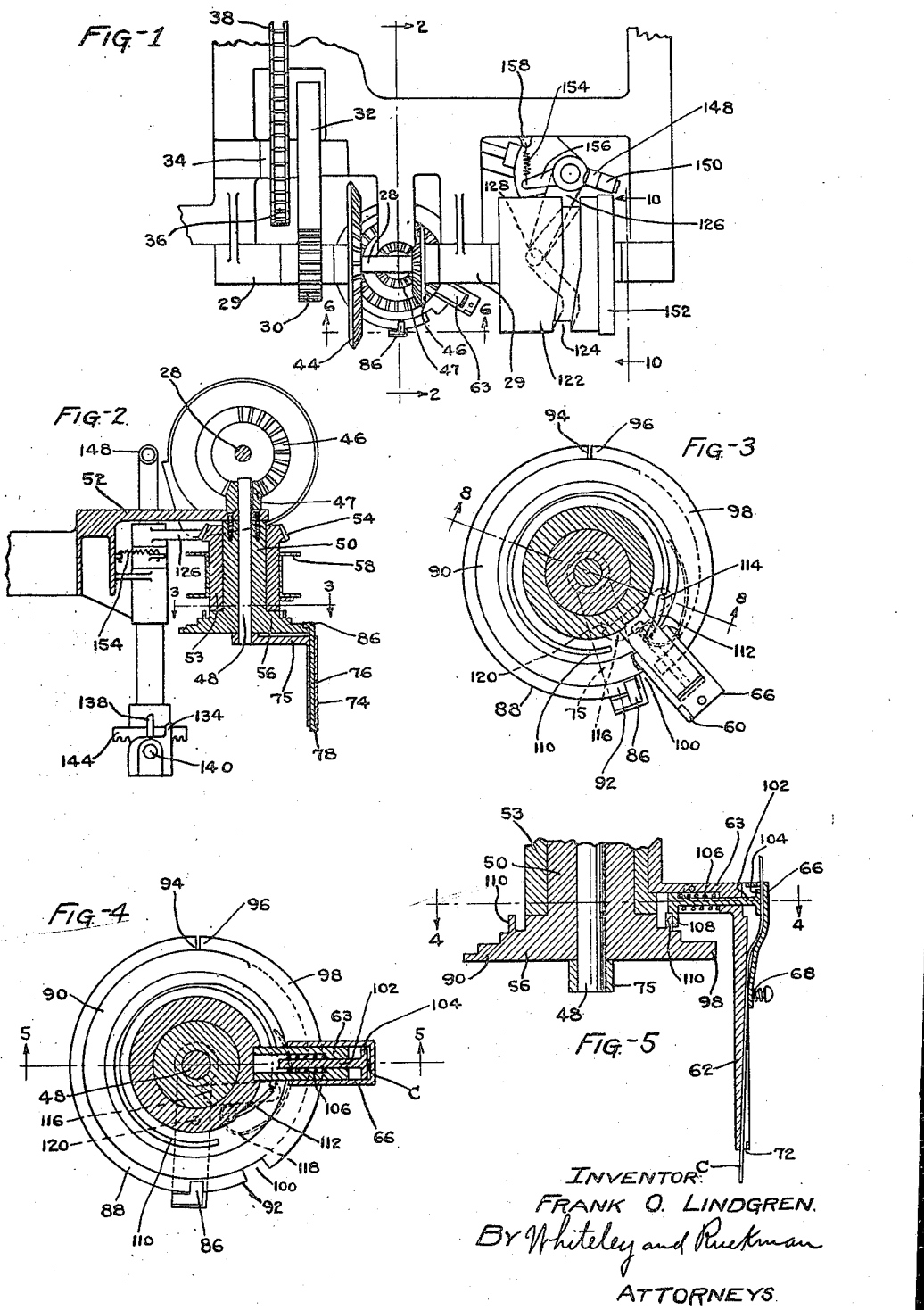

June 26, 1923.  F. O. LINDGREN  1,459,833
KNOTTING MECHANISM FOR TYING SACKS
Filed April 3, 1922   5 Sheets-Sheet 2
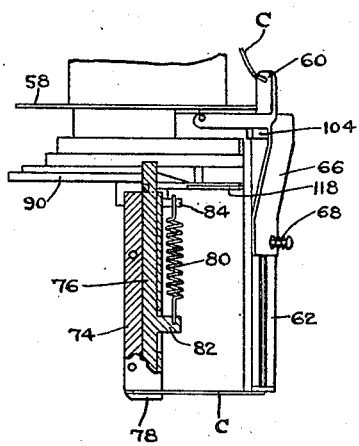
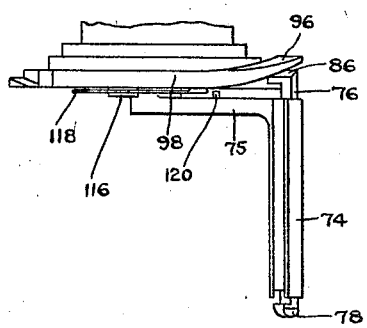
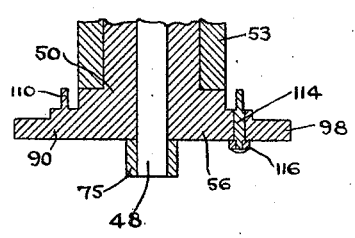
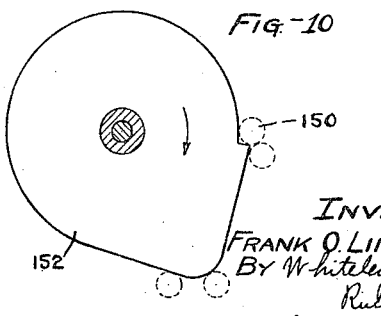
INVENTOR:
FRANK O. LINDGREN.
By Whiteley and
Rukman
ATTORNEYS.

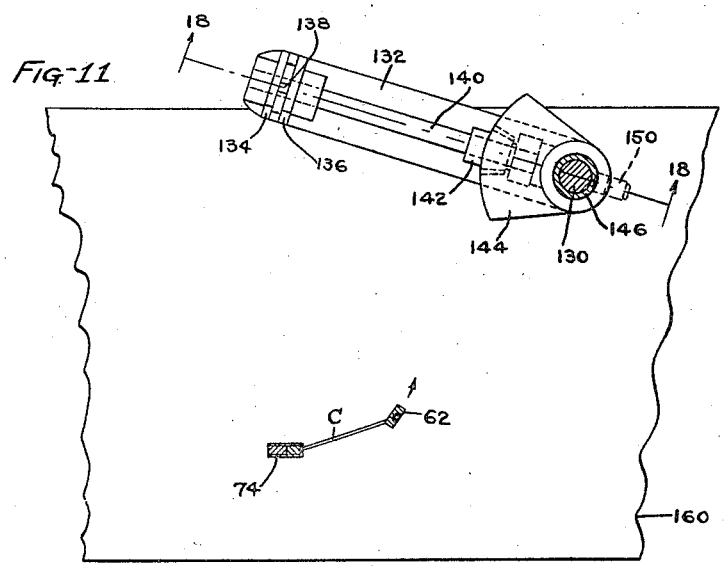
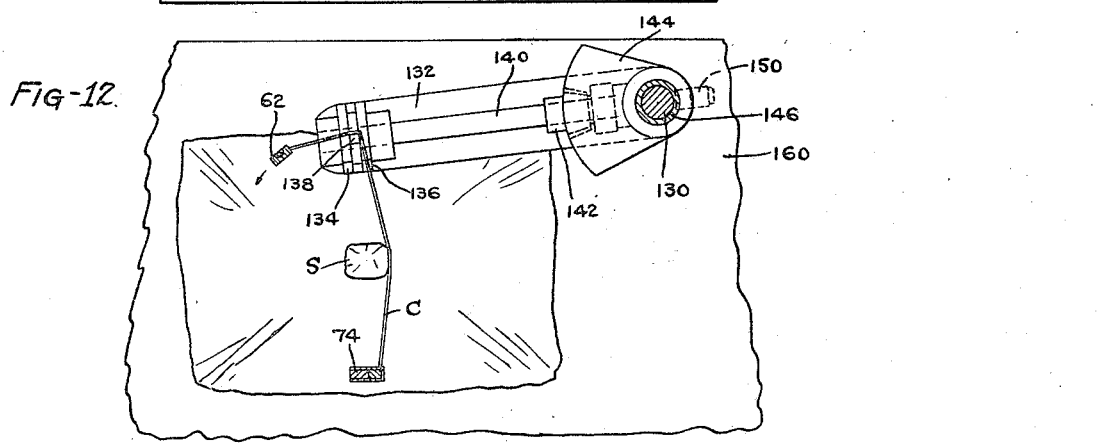
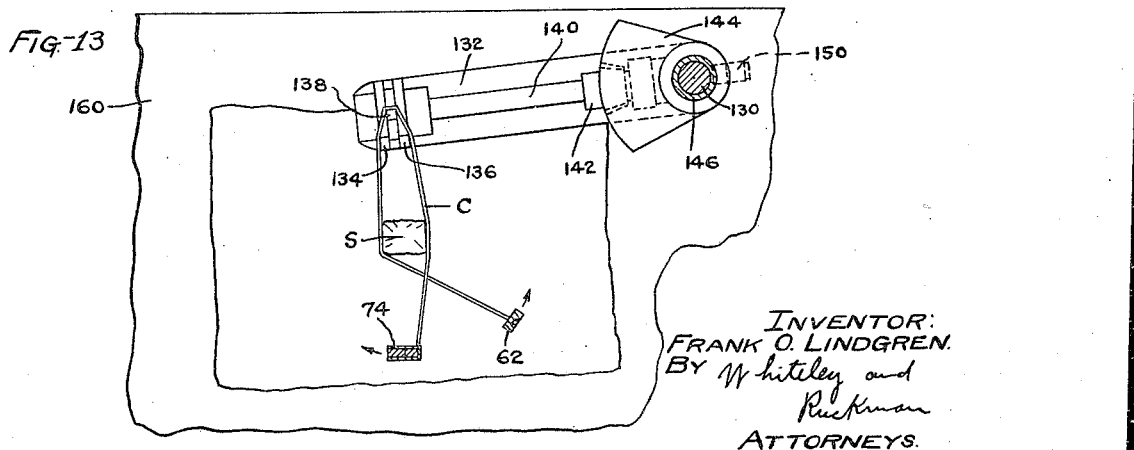

June 26, 1923.
F. O. LINDGREN
1,459,833
KNOTTING MECHANISM FOR TYING SACKS
Filed April 3, 1922 5 Sheets-Sheet 5
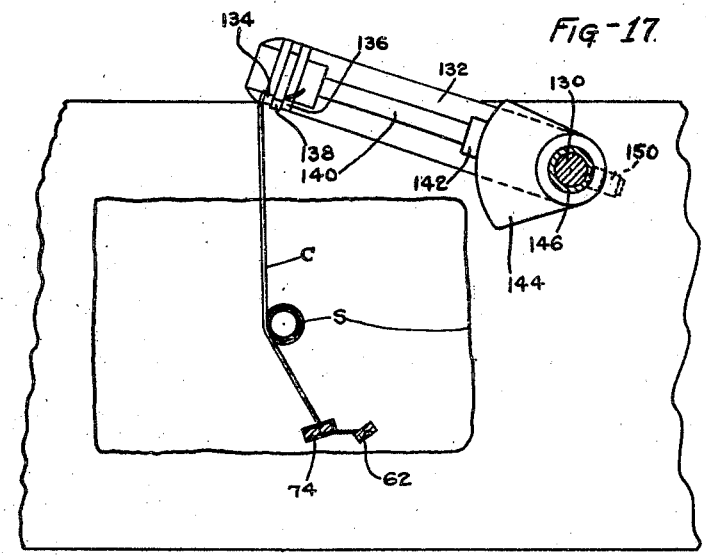
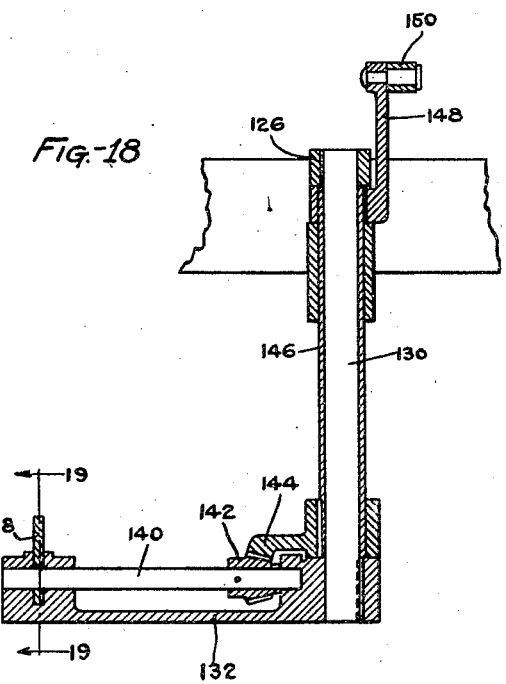
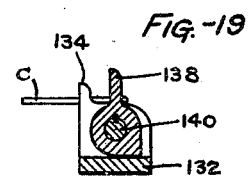
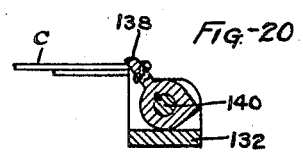
INVENTOR:
FRANK O. LINDGREN.
BY Whiteley and Ruckman
ATTORNEYS.

Patented June 26, 1923.

1,459,833

UNITED STATES PATENT OFFICE.

FRANK O. LINDGREN, OF MINNEAPOLIS, MINNESOTA.

KNOTTING MECHANISM FOR TYING SACKS.

Application filed April 3, 1922. Serial No. 549,345.

*To all whom it may concern:*

Be it known that I, FRANK O. LINDGREN, a citizen of the United States, residing at Minneapolis, in the county of Hennepin and State of Minnesota, have invented certain new and useful Improvements in Knotting Mechanism for Tying Sacks, of which the following is a specification.

My invention relates to knotting mechanism for tying sacks. An object is to provide mechanism which will lay loops of cord around the compacted mouth of a sack, arranging these loops so that the ends of the cord will be held in anchored position to form a so-called "knot", tighten the same by the action of the cord-laying mechanism, grip the cord beyond the loops which have been formed, and sever this cord when the tying operation has been completed so that the cord will be left in condition for another tying operation. This application discloses a construction constituting an improvement upon the knot-tying mechanism disclosed in my Patent No. 1,437,598 dated Dec. 5, 1922.

The full objects and advantages of my invention will appear in connection with the detailed description, and the novel features embodied in my inventive idea will be particularly pointed out in the claims.

In the accompanying drawings which illustrate the application of my invention in one form,—

Fig. 1 is a top plan view of the knotting mechanism. Fig. 2 is a view in vertical section on the line 2—2 of Fig. 1. Fig 3 is a view in horizontal section on the line 3—3 of Fig. 2. Fig. 4 is a view in horizontal section on the line 4—4 of Fig. 5. Fig. 5 is a view in vertical section on the line 5—5 of Fig. 4. Fig. 6 is a view in section on the line 6—6 of Fig. 1. Fig. 7 is an elevational view showing the gripping finger as it is being opened up. Fig. 8 is a view in vertical section on the line 8—8 of Fig. 3. Fig. 9 is a view showing a development of a cam with a cooperating roller shown in different positions. Fig. 10 is a view in section on the line 10—10 of Fig. 1. Figs. 11 to 17 are top plan views showing certain parts in progressively different positions. Fig. 18 is a view in vertical section on the line 18—18 of Fig. 11. Fig. 19 is a view in vertical section on the line 19—19 of Fig. 18. Fig. 20 is a view similar to Fig. 19 but showing a finger moved into a different position. Fig. 21 is a view of the completed knot.

The main operating shaft 28 of the knotting mechanism is mounted in bearings 29 formed on the framework of the machine and is intermittently driven by means of a spur gear 30 secured thereto which meshes with the teeth of a mutilated gear 32 secured to a short shaft 34 to which is also secured a sprocket wheel 36 driven by a sprocket chain 38. Secured upon the shaft 28 is a large bevel gear 44 and a smaller bevel gear 46, the latter having teeth for only about one-half of its circumference. The gears 44 and 46 and the parts associated therewith drive the various mechanisms for placing cord around the gathered mouth of a sack and for tying this cord. The gear 46 meshes with a gear 47 which is secured to a vertical shaft 48 mounted in a bearing 50 carried by a bracket 52 secured to the frame of the machine. The hub 53 of a bevel gear 54 is rotatably mounted upon the bearing 50 and this hub rests upon a horizontal flange 56 formed on the lower end of this bearing. The cord C which furnishes the material for tying the sack is drawn from a suitable reel, such as a reel 58 rotatably mounted upon the hub 53 and this cord passes from the reel through a guide 60 and extends downwardly within a groove contained in a vertical finger 62 which has a right angular portion 63 secured to the hub 53. The cord as it passes down said finger extends under a tensioning lever 66 which is pivoted to the finger, this lever carrying the guide 60 previously mentioned. The lower end of the lever 66 is held against the cord by a spring 68 whereby light tension is applied thereto. From an eye 72 at the lower end of the finger 62 the cord passes to a gripping and cutting member which includes a finger 74 which has a right angular portion 75 secured to the lower end of the shaft 48. Slidably mounted in a vertical passageway in the finger 74 is a shank member 76, the lower end of which is provided with a combined gripping and cutting head 78. This head is stressed upwardly by a spring 80 secured to a projection 82 on the shank 76 and to a projection 84 on the finger 74 as shown in Fig. 6. The upper end of the shank 76 is provided with an inwardly extending projection 86 which during the first part of the rotation of the finger rides upon a track 88 formed upon the upper peripheral surface of an annular flange 90 extending around the lower portion of the bearing member 50. The track 88 starts with an upward incline 92 and after extending for more than a semicircumference terminates at a point 94. The projection 86 while moving on the track 88 holds the head 78 firmly against the lower end of the finger 74 and when the projection 86 reaches the end of this track at 94, said projection moves under a downwardly inclined track portion 96 so that the head 78 is forced downwardly into open position and is held down by a segmental rim 98 which forms a continuation of the inclined portion 96 and which extends around most of the portion of the flange 90 which is not provided with the track 88. The rim 98 terminates short of the incline 92 on the track 88 so as to leave a gap 100. When the projection 86 reaches this gap, the spring 80 quickly pulls the shank 76 upwardly so that the head 78 is brought into closed position. The projection 86 then rides up the incline 92 and comes into the initial position shown in Fig. 3. It may be noted at this place that the finger 62 makes one rotation in counter-clockwise direction to lay the cord around the mouth of a sack before the finger 74 makes a single rotation in clockwise direction during which latter period the finger 62 makes a second rotation in counterclockwise direction. While the finger 62 is making its first rotation, the cord is subjected only to the light tension imparted by the spring 68 since, at this time, the cord has to be drawn out in order to provide sufficient material for the tying operation. During the second rotation of the finger 62, it is necessary to subject the cord to a greater tension in order that it may be pulled firmly around the mouth of the sack; therefore, the following device is provided. The horizontal member 63 is provided with a recess for slidably receiving a stem 102 having a head 104 on the outer end thereof, this head being normally retracted from engagement with the interior angular portion of the lever 66 by a spring 106 surrounding the stem 102. The inner end of the stem 102 is provided with a depending pin 108 which, during the first rotation of the finger 62, runs inside of an upwardly extending annular flange 110 carried by the horizontal flange 56. While the finger 62 makes its second rotation, the pin 108 is caused to ride upon the outside of the flange 110, thereby forcing the head 104 outwardly in opposition to the restraint of the spring 106 and causing the cord to be pinched between the head 104 and the lever 66 as best shown in Fig. 5. The flange 110 as shown in Figs. 3 and 4 is provided with a gap, and adapted to cooperate with this gap is a gate 112 which is secured to the upper end of a pin 114 which extends down through the horizontal flange 56 and has an arm 116 secured to its lower end, this arm being engaged by a spring 118 so that the gate 112 is held inwardly as shown in Fig. 4 when free to assume this position. An upstanding pin 120 is carried by the horizontal member 75 forming part of the finger 74. When the finger 74 is in initial position, as shown in Fig. 3, the pin 120 is so positioned as to hold the gate in open position. When the finger 74 begins to rotate in clockwise position, the gate 112 is released and assumes the closed position shown in Fig. 4 so that when the finger 62 makes its second rotation, the pin 108 is caused to travel up the outer surface of the gate and rotate in engagement with the outer surface of the finger 110, thereby causing the head 104 to be forced upon the cord and place it under heavy tension.

Secured upon the main operating shaft 28 of the knotter is a cylindrical member 122 having a cam slot 124 extending around in its peripheral surface. An arm 126 has a roller 128 mounted on its free end which rides in the cam slot 124. Fig. 9 represents a development of this cam member and shows different positions of the roller in the cam slot which positions are indicated at 128$^a$, 128$^b$, 128$^c$, 128$^d$, 128$^e$, 128$^f$, and 128$^g$. The arm 126 as best shown in Fig. 18 is secured to the upper end of a rock shaft 130 mounted in bearings carried by the frame of the machine. Secured to the lower end of the shaft 130 is an arm 132 which at its outer end carries two upstanding spaced fingers 134 and 136. Adapted for swinging movement into and out of the space between the fingers 134 and 136 is a finger 138 which is secured to a rockshaft 140 mounted in bearings formed on the arm 132. Secured to the shaft 140 is a pinion 142 in mesh with a segmental gear 144 secured to the lower end of a sleeve 146 which is rotatably mounted on the shaft 130. Secured to the upper end of the sleeve 146 is an arm 148, the upper end of which carries a roller 150 engaging a cam 152 which in the embodiment shown has the shape illustrated in Fig. 10. The roller 150 is maintained in engagement with the cam 152 by a spring 154 which at one end is secured to a projection 156 extending out from the sleeve 146 as shown in Fig. 1 and at its other end is secured to a fixed stop 158.

Figure 16:
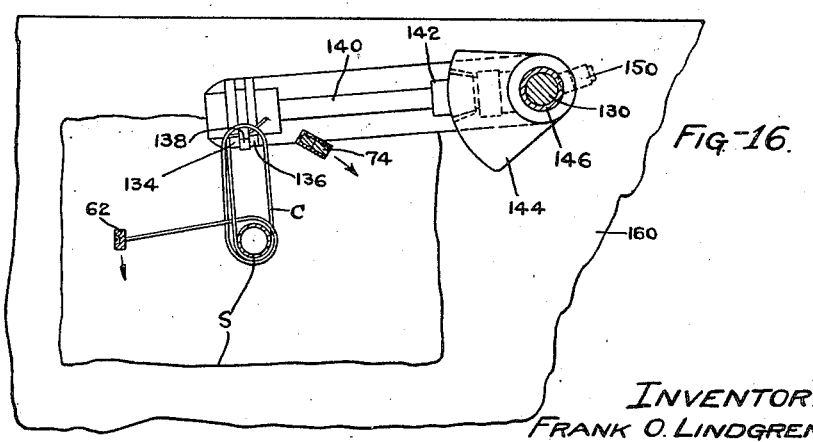

The complete cycle of operation of the knotting mechanism will now be readily understood. When the parts of the knotter are at rest in the positions shown in Figs. 3 and 11, a filled sack is moved into tying position underneath the same in suitable manner, as by an intermittently operated conveyor belt 160 and rotation of the shaft 28 is started by means of gear 30 and its driving connections which constitute no part of the present invention. The gear 44 causes rotation of the gear 54 and rotation of the finger 62 through which the cord is threaded. The end of the cord is at this time held by the head 78 at the lower end of the finger 74. On account of the gear 46 being mutilated the finger 74 does not immediately begin its movement but remains at rest during the first part of the cord laying and tying operation. The cord will, therefore, be carried along the right hand side of the mouth of the sack S, as shown in Fig. 12 and will be placed back of the fingers 134, 136 and 138, the finger 138 being at this time held back in the position shown in Fig. 19. The roller 128 soon after this operation starts occupies the position in the cam groove indicated at $128^b$ in Fig. 9 so that the arm 132 is brought forward into position shown in Fig. 12. Continued rotation of the finger 62 brings the cord forward around the mouth of the sack as shown in Fig. 13, it being noted that the finger 62 passes outside of the finger 74 and when the finger 62 reaches the position shown in this figure, the teeth on the mutilated gear 46 come into engagement with the teeth of the gear 47 so that the finger 74 starts to move in a circular path but in the opposite direction from that in which the finger 62 moves. The roller 128 now moves to the position indicated at $128^d$ in Fig. 9 so that the arm 132 is moved back slightly whereby the finger 62 now passes in front of the fingers 134, 136 and 138 as shown in Fig. 14. When the finger 62 has passed this point, the roller 128 comes into the position indicated at $128^e$ in Fig. 9, thereby causing the arm 132 to move forward slightly into the position shown in Fig. 15 so that the lower end of the finger 74 carrying the end of the cord passes between the finger 138 and the fingers 134 and 136, thereby placing the cord between these fingers. The cam 152 then causes the finger 138 to move forward and grip the end portion of the cord between the latter and the fingers 134 and 136 as shown in Fig. 16. When the finger 74 has passed the finger 138, its clamping head 78 is forced down on account of the upper end of the shank 76 moving under the downwardly inclined track portion 92 and the end of the cord is released so as to be held only between the finger 138 and the fingers 134 and 136. During this time the finger 62 again carries the cord around the mouth of the sack, this portion of the cord being placed underneath the portion which is being carried by the finger 74 but being positioned above the portion previously laid as is evident from Figs. 15 and 16. Also during this time, the tensioning head 104 has been caused to clamp the cord on account of the pin 108 moving around on the outside of the flange 110 as previously explained. This places the cord under tension so that it is drawn tightly around the mouth of the sack. When the cam 152 causes the finger 138 to move forward to grip the end portion of the cord, the portion of the cord back of this finger slides off the same while the arm 132 is moved back into the position shown in Fig. 17 caused by the roller 128 moving from the position $128^f$ to the position $128^g$. This operation pulls the cord taut since the end of the cord is still held between the finger 138 and the fingers 134 and 138. When the roller 150 runs over the raised portion of the cam 152, the finger 138 is moved back into the position shown in Fig. 19 and the end of the cord is released. As the fingers 62 and 74 approach each other from their position shown in Fig. 16 toward their position shown in Fig. 17, the cord is caused to pass above the gripping head 78 carried by the shank 76 which is still held in open position by the downwardly inclined track portion 96. As soon as the shank 76 reaches the gap 100, the head 78 is pulled up with a quick snappy action by the spring 80 and the inturned upper end of the shank rides up the incline 92 so that the cord is firmly gripped by the head 78 and is cut by the sharp edges between the same and the lower end of the finger 74. The knotting mechanism now comes to rest with the parts in the position shown in Fig. 11 ready to commence another cycle of operations such as just described.

I claim:

1. A knotting mechanism for tying sacks comprising means for laying a cord around the mouth of the sack, an oscillating arm, two spaced fingers on the free end of said arm, a rock shaft mounted on said arm, a finger carried by said rock shaft and adapted to move into and out of the space between said spaced fingers, means for causing the first portion of the laid cord to pass back of all of said fingers, means for causing the second portion of the laid cord to pass behind said spaced fingers and in front of the other finger, and means for closing the last mentioned finger upon the second portion of the laid cord.

2. A knotting mechanism for tying sacks comprising means for laying a cord around the mouth of a sack, an oscillating arm, two spaced fingers on the free end of said arm, a cam for causing oscillatory movements of said arm, a rock shaft mounted on said arm, a finger carried by said rock shaft and adapted to move into and out of the space between said spaced fingers and a cam for rocking said shaft to cause the finger carried thereby to grip the end of the cord between the same and the two spaced fingers.

3. A knotting mechanism for tying sacks comprising a finger through which the cord is threaded, means for gripping the end of the cord, means for causing said finger to move twice around the mouth of the sack, means for applying a heavy tension to the cord during the second rotation of said finger, and means for rendering said tension-applying means inactive during the first rotation of said finger.

4. A knotting mechanism for tying sacks comprising a finger through which the cord is threaded, a finger for gripping the end of the cord, means for causing said first mentioned finger to move twice around the mouth of the sack, means associated with said gripping finger which cause it to remain at rest during this first portion of the movement of said first mentioned finger, and then to move once around the mouth of the sack during the second portion of the movement of said first mentioned finger and in the opposite direction to the direction of movement thereof, means carried by the first mentioned finger for applying a heavy tension to the cord during the second rotation of said finger, and means for rendering said tension-applying means inactive during the first rotation of said finger.

5. A knotting mechanism for tying sacks comprising a finger through which the cord is threaded, a finger for gripping the end of the cord, means for causing said first mentioned finger to move twice around the mouth of the sack, means associated with said gripping finger which causes it to remain at rest during the first portion of the movement of said first mentioned finger and then move once around the mouth of the sack during the second portion of the movement of said first mentioned finger and in the opposite direction to the direction of movement thereof, a spring-tensioned lever carried by the first of said fingers for applying a light tension to the cord during its first rotation, a clamping head spaced from said lever, and means for causing said clamping head to clamp the cord between the same and said lever during the second rotation of said finger.

6. A knotting mechanism for tying sacks comprising means for laying a cord around the mouth of a sack, an oscillatory arm, a rock shaft to which said arm is secured, a cam for rocking said shaft, two spaced fingers on the free end of said arm, a rock shaft mounted on said arm, a sleeve surrounding said first mentioned rock shaft, gears between said sleeve and said second mentioned rock shaft, an arm secured to said sleeve, a cam for operating said arm, and a finger carried by said second mentioned rock shaft and adapted to move into and out of the space between said spaced fingers.

7. A knotting mechanism for tying sacks comprising a finger through which the cord is threaded, a finger for gripping the end of the cord, means for causing said first mentioned finger to move twice around the mouth of the sack, means associated with said gripping finger which cause it to remain at rest during the first portion of the movement of said first mentioned finger and then to move once around the mouth of the sack during the second portion of the movement of said first mentioned finger and in the opposite direction to the direction of movement thereof, an oscillatory arm, two spaced fingers on the free end of said arm, a rock shaft mounted on said arm, a finger carried by said shaft and adapted to move into and out of the space between said spaced fingers, means associated with said fingers for positioning them in such manner that the first mentioned finger passes back of all of them during its first movement around the mouth of the sack and passes in front of them during its second movement around the mouth of the sack and so that the gripping finger passes behind said spaced fingers and in front of the finger carried by the rock shaft during its movement around the mouth of the sack, means which causes said gripping finger to release the end of the cord when it has passed said fingers, and means for closing said fingers upon the cord to hold the end thereof when thus released.

In testimony whereof I hereunto affix my signature.

FRANK O. LINDGREN.